Oct. 25, 1938.  F. C. FRANK  2,134,509
BRAKE
Filed Sept. 18, 1935   2 Sheets-Sheet 1

INVENTOR.
FREDERICK C. FRANK
BY Jerome R. Cox
ATTORNEY

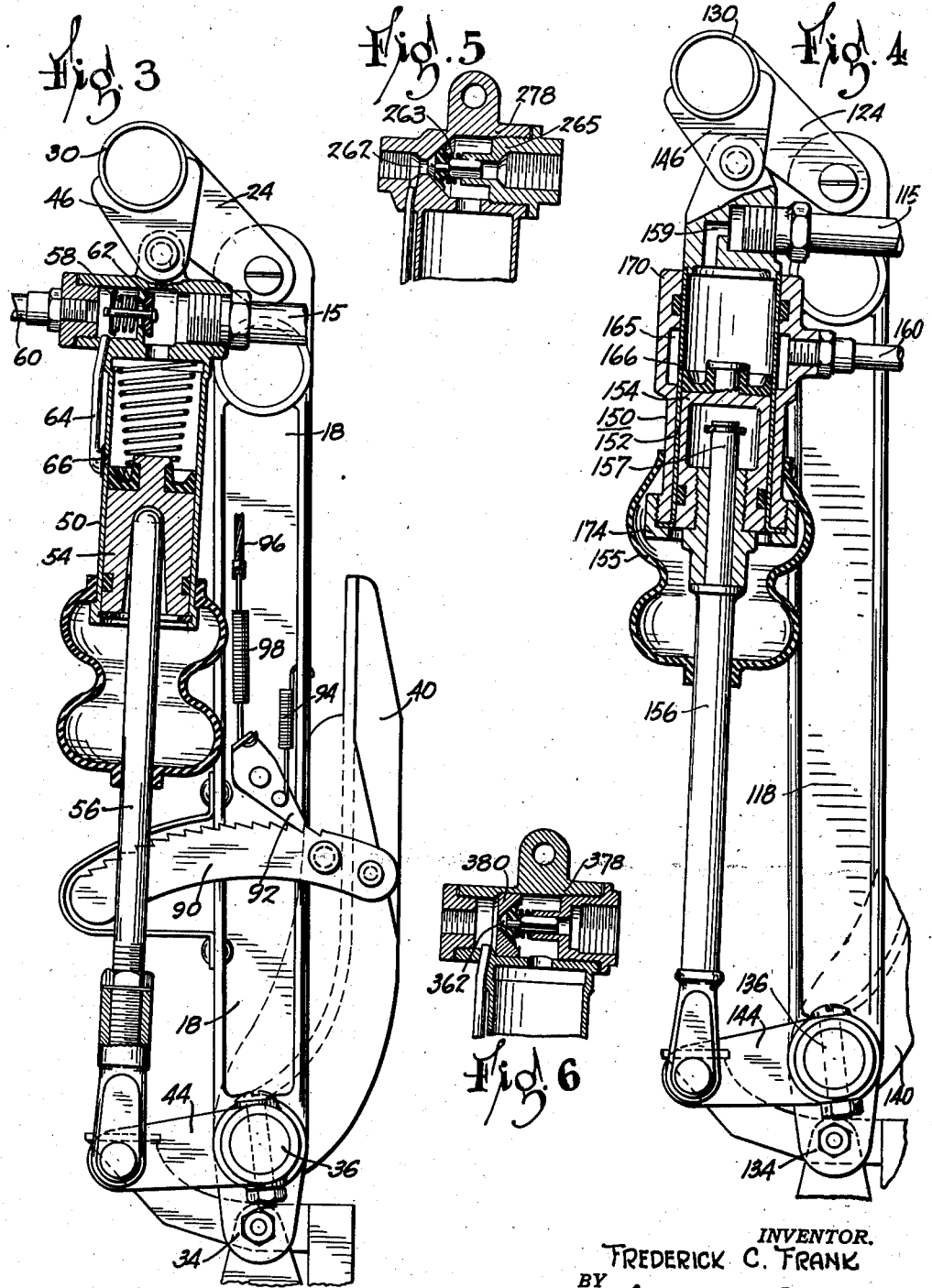

Patented Oct. 25, 1938

2,134,509

UNITED STATES PATENT OFFICE 2,134,509

BRAKE

Frederick C. Frank, South Bend, Ind., assignor to Bendix Products Corporation, South Bend, Ind., a corporation of Indiana Application September 18, 1935, Serial No. 41,137

6 Claims. (Cl. 244—36)

This invention relates to brakes and more particularly to an airplane braking system having an improved arrangement for applying brakes either uniformly or differentially to the two wheels of the airplane.

One of the objects of the invention is to provide an improved hydraulic actuating system for the brakes of an airplane so arranged as to be operated by pedals mounted on the rudder actuating mechanism and arranged to operate the brakes on opposite sides of the airplane corresponding to the sides on which the pedals are mounted.

One of the features of the arrangement shown is the provision of a pair of master cylinders designed for operating hydraulic brakes each separately mounted upon one of the rudder pedals.

A further feature of the arrangement shown is the provision of a substantially parallelogram arrangement by means of which the pedals operating the brakes are maintained always substantially in a comfortable operating position.

Further objects and features of the invention will be apparent after a reading of the subjoined specification and claims and after a consideration of the accompanying drawings in which:

Figure 3 is a view partially in section showing a portion of one of the pedals shown in Figure 2 and showing the master cylinder mounted thereon;

Figure 4 is a view similar to Figure 3 but showing a modified arrangement of the master cylinder;

Figure 5 is a fragmentary view showing a modified arrangement of the valve to be used in a cylinder similar to that shown in Figure 3; and Figure 6 is a view similar to Figure 5 showing another modified form of valve.

Figure 1:
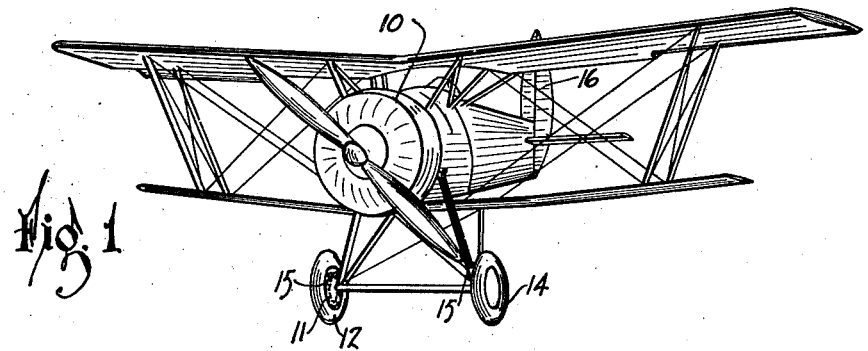
Figure 1 is a view showing an airplane in which there is incorporated an arrangement according to my invention.
Figure 2:
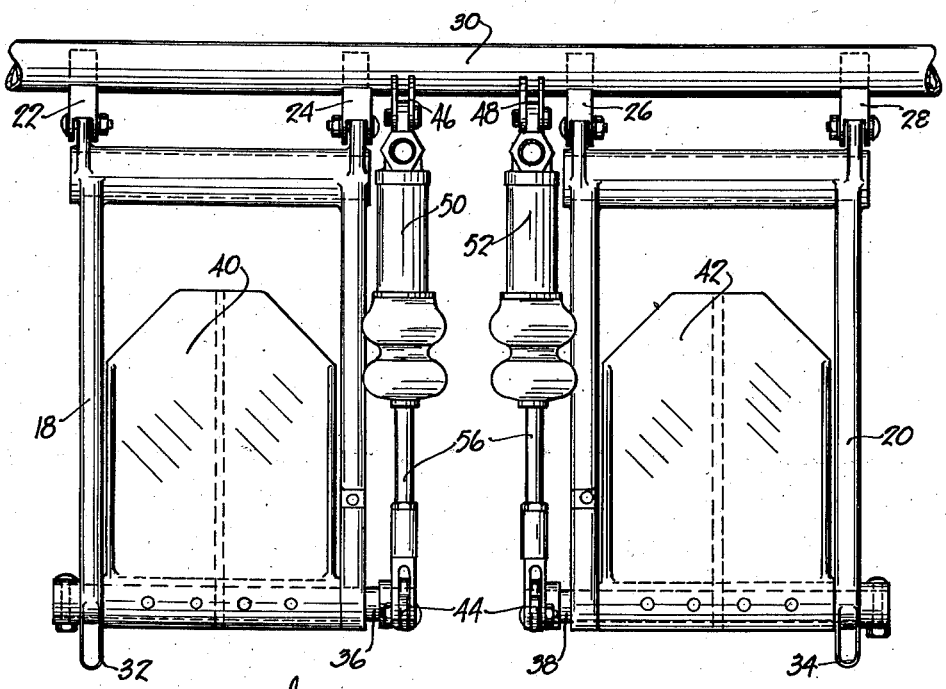
Figure 2 is a view in elevation showing the brake and rudder pedal arrangement for the airplane of Figure 1.

Referring to Figures 1 and 2 there may be seen an airplane 10 provided with brakes 11 for the landing wheels 12 and 14, the brakes being actuated hydraulically by wheel cylinders to which fluid is supplied by conduits 15. A rudder 16 is arranged to be controlled by rudder stirrups 18 and 20 preferably by cables not shown. The stirrups 18 and 20 are pivotally mounted on lugs 22, 24, 26 and 28 welded to a cross shaft 30.

The stirrups 18 and 20 carry projections 32 and 34 which are connected as by cables with the rudder 16 so as to operate the rudder.

Extending through openings in the lower end of the stirrups 18 and 20 are shafts 36 and 38 which are mounted for rotation in said openings. The shafts 36 and 38 have riveted thereto, brake pedals 40 and 42 and carry angularly disposed arms 44. The shaft 30 has secured to it (as by welding) lugs 46 and 48. Pivotally connected to the lugs 46 and 48 are master cylinders 50 and 52 each having a piston such as 54. The pistons are connected by piston rods 56, with the arms 44 so that actuation of the pedals 40 and 42 transmit force through the piston rods 56 to move the pistons 54 in the master cylinders 50 and 52 to operate the master cylinders and thus transmit force through the fluid conduit 15 to operate the brakes. The master cylinder is provided with valve chambers 58 which are connected by the conduits 15 with the brakes. Thus movement of the pistons 54 upward forces fluid out of the main chamber of the master cylinders into the valve chambers 58 and then through the conduits 15 to the brakes 11.

The valve chamber 58 is connected also with a source of supply. The source of supply comprises a conduit 60 which may be combined with a convenient reservoir to which the conduit leads. Positioned in the chamber 58 so as to separate the conduit 60 from the main portion of the chamber is a check valve 62 so arranged as to allow fluid to flow freely into said main portion from the conduit 60, but to prevent the flow of liquid in the opposite direction.

A tube 64 leads from the chamber 58 on the same side of the valve 62 as the conduit 60. The tube 64 leads to a port 66 in the side of the master cylinder 50 and thus when the master piston 54 is in a released position (as shown in Figure 3) liquid may flow freely from the source of supply 60 through the conduit 64 and port 66 into the master cylinder and thence through the chamber 58 and the conduit 15 to the brake cylinder. Thus when the piston is in its released position changes in volume in the liquid due to changes in temperature or any other change do not affect the brake. However, when either pedal 40 is depressed to operate its piston 54 through its piston rod 56, the port 66 is covered by the piston. The liquid acted on by the master cylinder piston, cannot then escape through the tube 64 nor can it escape past the check valve 62 and thus is forced out through the conduit 15 to the associated brake to apply it.

It is to be understood that when the rudder is operated through the stirrups 18 and 20 then due to the substantially parallelogram arrangement of the stirrups 18 and 20 and the links comprising the master cylinders 50 and 52 and their piston rods 56, the relative position of the pedals 40 and 42 on the stirrups 18 and 20 remain substantially unchanged. It is to be noted, however, that the length of the arm 44 is slightly longer than the distance between the pivotal axis of the stirrup and the pivotal axis of the master cylinder and thus the pedals 40 and 42 move slightly with the natural movement of the toe as the stirrups are operated by the heel of the pilot. Thus pedals 40 and 42 are always in a convenient position so that the pilot may depress and rotate them relative to the stirrups and thus apply the brakes.

Latches are provided for holding the brakes applied when the airplane is on the ground as in parking. These latches comprise (see Figure 3) toothed members 90 fixed to the brake pedals 40 and 42, dogs 92 pivoted on the stirrups 18 and 20 and normally held out of contact with the members 90 by springs 94 also connected to the stirrups 18 and 20. When it is desired to latch any brake in any applied position a pull is exerted on a cable 96 which tensions a spring 98 having greater force than the spring 94 thus moving the dog 92 into contact with the teeth of the toothed member 90 and holding the brake in the applied position.

In Figure 4 there is shown an arrangement similar to that shown in Figure 3 and similar parts have been designated by like numerals with the addition of 100. The master cylinder 150 includes a casting 170 through which there is inserted a thin sleeve 152 provided with a port 166. The sleeve is clamped in position by a screw cap 174 and the piston is formed in two parts, comprising the piston proper 154 and the piston rod connection 155 threaded into the piston proper. The piston rod 156 has a lost motion connection as at 157 with the member 155. A threaded and bored coupling member 159 is welded to the upper end of the sleeve 152 and has connected thereto a conduit 115 leading to the brakes. The casting 170 is formed with an annular recess 165 which registers with the port 166 and connected to this recess 165 is a conduit 160 leading to the source of supply. It may be seen that with this arrangement machining of parts other than sleeve 152 and the piston 154 is minimized. It is also to be noted that with this arrangement no check valves need to be used. The lost motion connection between the piston rod 156 and the member 155 is intended to prevent the drawing in of air at the wheel cylinders such as might otherwise occur by reason of the omission of the check valve.

In the arrangement shown in Figure 5 the check valve 262 is bevel shaped and is urged toward its seat by a spring 263 which bears at its opposite end on a member 265 threaded into the casing 278.

In the arrangement shown in Figure 6 the valve 362 rests upon a seat 380 formed as an insert and secured within the casing 378.

It is believed that the operation of my device will be apparent from the above disclosure. Operation of the stirrups 18 and 20 controls the rudder through any appropriate connections. Movement of the foot pedals 40 and 42 relative to the stirrups 18 and 20 operates the master cylinder to force fluid from said cylinders through the conduit 15 to the brakes 11 and thus controls the braking of the wheels of the airplane.

It is to be understood that the above described embodiments of my invention are for the purpose of illustration only and various changes may be made therein without departing from the spirit and scope of the invention.

I claim:

1. A brake system for an airplane comprising a pair of rudder pedals in the form of stirrups, a pair of brake pedals one mounted on each of said rudder pedals, a master cylinder mounted on each of said rudder pedals, brakes, means whereby movement of each of said brake pedals relative to its associated rudder pedal actuates one said master cylinder, and means whereby actuation of each of said master cylinders operates one of said brakes, further characterized in that there is provided a brake pedal arm operated by each brake pedal and in that each master cylinder is pivoted at its upper end, normally has its longitudinal axis substantially vertical, and has a piston in the lower end thereof connected by a piston rod with said brake pedal arm so that the piston is arranged to be moved upward upon movement of the brake pedal, the link comprising said master cylinder and its piston being disposed substantially parallel to the stirrup but the brake pedal arm being longer than the distance between the pedal axis of the stirrup and the pedal axis for the master cylinder, whereby movement of the rudder pedals in controlling the rudder causes a corresponding movement of the pivotal axis of the brake pedal but a differential movement of the opposite end of the brake pedal.

2. A braking system for an airplane comprising a pair of rudder pedals in the form of stirrups, a pair of brake pedals one mounted pivotally on each of said rudder pedals, a master cylinder mounted on each of said rudder pedals, brakes, means whereby movement of each of said brake pedals relative to its associated rudder pedal actuates its associated master cylinder, and means whereby actuation of each of said master cylinders operates one of said brakes, further characterized in that the master cylinder is provided with a piston and together with the piston comprises a link disposed substantially parallel to the stirrup.

3. A braking system for an airplane comprising a pair of rudder pedals in the form of stirrups, a pair of brake pedals one mounted pivotally on each of said rudder pedals, a master cylinder mounted on each of said rudder pedals, brakes, means whereby movement of each of said brake pedals relative to its associated rudder pedal actuates its associated master cylinder, and means whereby actuation of each of said master cylinders operates one of said brakes, further characterized in that each master cylinder is provided with a piston and together with the piston comprises a link disposed substantially parallel to the stirrup, and in that there is provided a brake pedal arm pivotally connected to each said piston rod which is longer than the distance between the pivotal axis of the stirrup and the pivotal axis of the master cylinder.

4. In a control system for a vehicle, a control member swingably mounted on the vehicle frame, a brake pedal mounted on the end of the control member swingable therewith and operable to apply a brake when the control member is in any of its several positions, and means for maintaining said brake pedal in substantially parallel relation to any of the several positions it occupies as said control member is moved, said last-named means comprising a brake operating lever secured to said pedal, a master cylinder hinged to the vehicle frame in spaced relationship to the swingable mounting of the control member, a piston in said cylinder and a piston rod connected to the piston and said lever, said master cylinder, piston and piston rod being disposed substantially parallel to said control member.

5. In a control system for a vehicle, a control member pivotally mounted on the vehicle frame, a brake pedal mounted on the free end of the member, a lever secured to said pedal, and a master cylinder, piston and piston rod assembly having one end pivotally mounted on the vehicle frame and one end connected to said lever.

6. In a control system for a vehicle, a control member pivotally mounted on the vehicle frame, a brake pedal mounted on the free end of the member, a lever secured to said pedal, and a master cylinder, piston, and piston rod assembly having one end pivotally mounted on the vehicle frame and one end connected to said lever, said member, lever, frame, and master cylinder and piston and piston rod assembly constituting a four bar linkage to position said pedal in accordance with the position of said member.

FREDERICK C. FRANK.